(12) United States Patent
King et al.

(10) Patent No.: US 8,839,001 B2
(45) Date of Patent: Sep. 16, 2014

(54) INFINITE KEY MEMORY TRANSACTION UNIT

(75) Inventors: Edward C. King, Pleasanton, CA (US);
Paul J. Lemmon, Livermore, CA (US);
Laszlo Hars, Lafayette, CO (US)

(73) Assignee: The Boeing Company, Chicago, IL (US)

(*) Notice: Subject to any disclaimer, the term of this patent is extended or adjusted under 35 U.S.C. 154(b) by 69 days.

(21) Appl. No.: 13/341,630

(22) Filed: Dec. 30, 2011
(Under 37 CFR 1.47)

(65) Prior Publication Data
US 2013/0013934 A1    Jan. 10, 2013

Related U.S. Application Data

(60) Provisional application No. 61/505,039, filed on Jul. 6, 2011.

(51) Int. Cl.
*G06F 11/30* (2006.01)
*G06F 12/14* (2006.01)
*G06F 21/79* (2013.01)

(52) U.S. Cl.
CPC ............ *G06F 12/1408* (2013.01); *G06F 21/79* (2013.01)

USPC .......................................................... 713/190

(58) Field of Classification Search
USPC .......................................................... 713/190
See application file for complete search history.

(56) References Cited

U.S. PATENT DOCUMENTS

| | | | |
|---|---|---|---|
| 7,093,137 B1* | 8/2006 | Sato et al. | 713/193 |
| 7,353,404 B2* | 4/2008 | Hashimoto et al. | 713/194 |
| 7,469,344 B2* | 12/2008 | Folmsbee | 713/190 |
| 7,802,108 B1* | 9/2010 | Master et al. | 713/193 |
| 7,894,599 B2* | 2/2011 | Rigler | 380/28 |
| 7,937,595 B1* | 5/2011 | Kumar et al. | 713/192 |
| 8,370,645 B2* | 2/2013 | Asnaashari | 713/193 |
| 8,504,849 B2* | 8/2013 | Jogand-Coulomb et al. | 713/194 |

* cited by examiner

*Primary Examiner* — Amare F Tabor (57) ABSTRACT

A system for providing high security for data stored in memories in computer systems is disclosed. A different encryption key is used for every memory location, and a write counter hides rewriting of the same data to a given location. As a result, the data for every read or write transaction between the microprocessor and the memory is encrypted differently for each transaction for each address, thereby providing a high level of security for the data stored.

17 Claims, 7 Drawing Sheets

INFINITE KEY MEMORY TRANSACTION UNIT

REFERENCE TO RELATED APPLICATION

This application claims priority to U.S. Provisional Application No. 61/505,039, filed Jul. 6, 2011, entitled "Secure Server for Configuring and Programming Secure Microprocessors and Infinite Key Memory Transaction Unit," which is incorporated herein by reference for all purposes.

BACKGROUND OF THE INVENTION

To provide for secure communications and protection of financial, military, medical or other data requiring a high degree of protection, computer and microprocessor-based systems now implement various security measures. These measures are generally intended to preclude an attacker's illicit access to data stored in a memory being accessed by the microprocessor, for example, because the memory and microprocessor are on the same circuit board and/or coupled by a bus. Common types of attacks on such processors are (i) copy and paste, (ii) data replay, and (iii) pattern recognition of known data. In copy and paste attacks an adversary tries to read a range of locations of memory and copy it to somewhere else where it can be decrypted and used. The success or failure of this also enables the adversary to determine whether any encryption scheme depends on the memory addresses. In data replay attacks, the adversary copies content from a memory location at one time during operation of the system back later to the same memory location to try to cause predictable changes. Such attacks can cause harm to a secure computer, for example by creating an infinite loop, or otherwise impact the program. In a known data recognition attack, an adversary may attempt to learn an encryption key by watching writes of known data to the same address. Herein we provide a more secure approach to protecting microprocessor accesses to a memory.

BRIEF SUMMARY OF THE INVENTION

This invention relates to protection of data in computer systems, and in particular, to the protection of data stored in memories in computer systems, which data are being transferred on buses between units in computer systems. In our preferred implementation, we include an infinite key memory transaction unit (IKMTU) which is used in all transactions—read or write—to a memory. The IKMTU provides with high probability a different encryption key for every memory location, and for every write to every memory location. During read transactions, previously encrypted data are retrieved from the memory by the IKMTU, decrypted, and authenticated against signs of tampering. If the data are considered valid the data are returned to the device requesting that data. In write transactions the IKMTU reads the data at the destination address, then decrypts and authenticates that data as at read access. Once this is complete, the data to be written are merged with the data read from the location, encrypted, and then written back to the memory.

In a preferred embodiment, our method for providing security for read data being transferred between- or within units in a computer system includes the steps of dividing the memory into a series of addressable locations, each having an address and each storing encrypted data, version information and an authentication value. A very likely unique encryption key is used for each address. The encrypted data and the version information and the authentication value are retrieved. The data are decrypted with the key corresponding to the memory address and the version information, and the authentication value is checked to determine if the data are valid.

In write operations, assuming the data read from the location are verified by the IKMTU as valid, new data are written to the address from which the data were retrieved using a new key for encryption of the data to be written. The new key is based on the address and on the number of writes made to that address. In a preferred embodiment, the authentication value depends on the data, and also depends on the address and the number of writes made to that address.

Our system provides substantially higher security for data in microprocessor-based systems in which the data, for example financial, medical, or military, require high security and the prevention of access other than to authorized users.

DETAILED DESCRIPTION OF THE INVENTION

We have developed a system for encryption of data being communicated over a bus between a memory and a processor, typically between a microprocessor and dynamic random access memory coupled to that microprocessor. We refer to the system as an infinite key system because a different encryption key is used for every memory location and for every write, even subsequent writes to the same address. A write counter value hides the rewriting of the same data to a given address. Thus, the data for every transaction between the microprocessor and the memory is encrypted differently for each transaction for each address. This provides a high level of security and enhances protection of the data stored in memory.

Our system can be programmed to remap any logical requested address to point to an internal or external memory, e.g. using a physical address. The system uses a concept of a memory window and can manage any desired number of different windows (two in the preferred embodiment) with independent encryption policies and independent security strengths. In our preferred embodiment the minimum size of each window is 16 bytes and the maximum size of each window is 2 gigabytes.

During a read transaction, previously encrypted data are read from the memory. Then the encrypted data (ciphertext) are decrypted, the resulting plaintext is authenticated against signs of data tampering, and provided to the requesting device. During a write transaction, the encrypted data at the destination address are read, decrypted, and authenticated against signs of data tampering, just as with a read transaction. Once this is complete, the data to be written are merged with the data read from the memory. The merged data are encrypted, the write counter is incremented and attached, a new authentication tag is computed and attached and then the resulting record is written back to the memory. All write transactions are implemented as read-modify-write, so that even when the requester is writing an entire 128-bit word, the data at the destination address are read, authenticated, and merged, before the write occurs.

If data tampering is detected, our system can, for example (i) stop processing all read and write requests, (ii) delete the random number that is used for the current session, (iii) flush all registers that participated in key generation activities, or (iv) trigger a memory flush to overwrite the content of the memory windows with all zeros. The choice of the action taken depends upon previously configured security policies, outside of the IKMTU.

Figure 1:
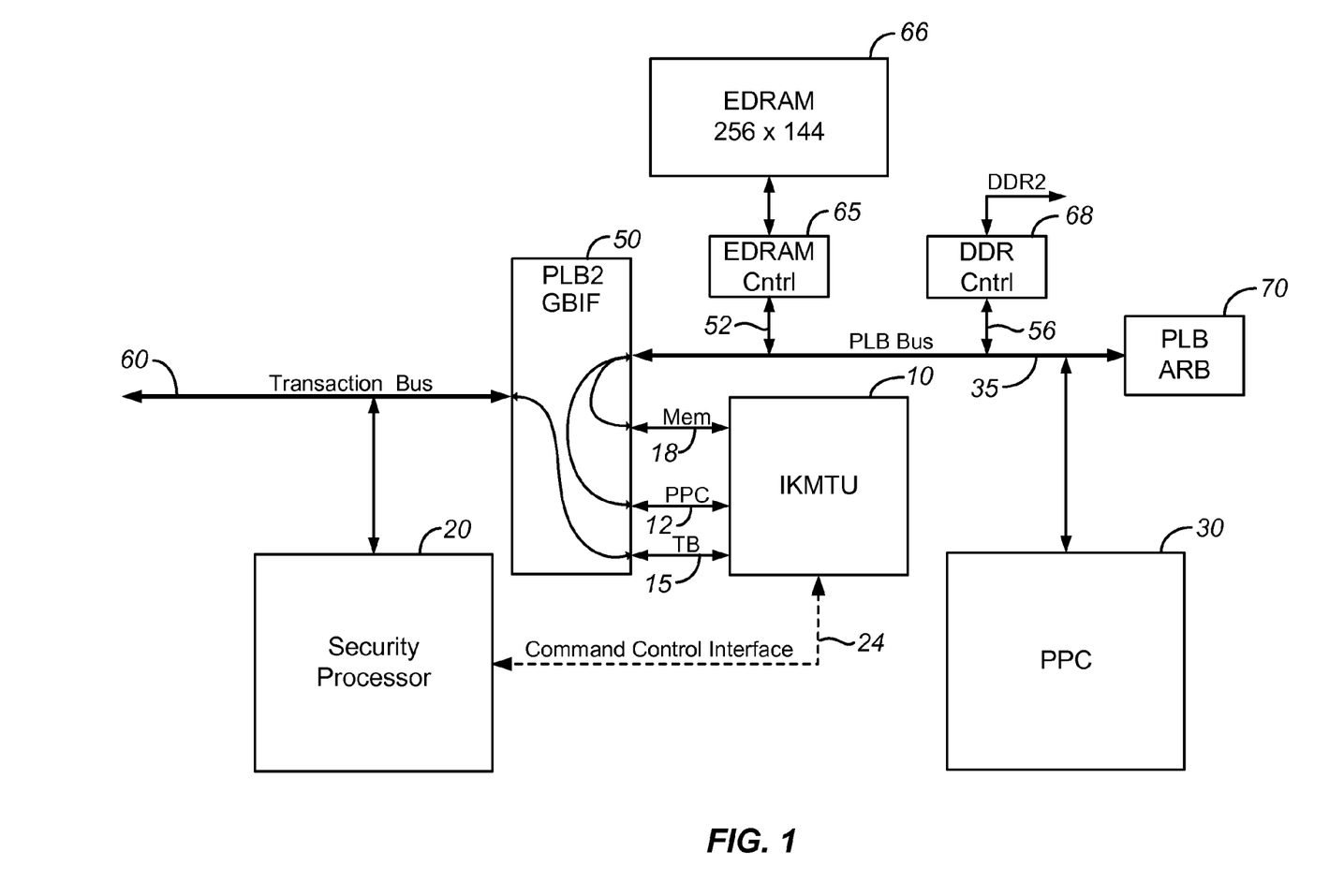
FIG. 1 is a block diagram of a system illustrating the IKMTU unit.

As stated, we use the term "infinite key memory transaction unit" to describe the unit which performs the functions described above. FIG. 1 is a block diagram of an exemplary system which includes a microprocessor core and illustrates the context in which the infinite key memory transaction unit 10 of this invention resides. The IKMTU 10 encrypts and decrypts data transfers between the microprocessor and external memory to provide a high level of security for these transactions. The security is intended to thwart others from being able to modify or read data from the memory in a manner which might reveal the contents of that memory.

In FIG. 1 the IKMTU 10 has three bidirectional external data interfaces and one bidirectional command and control interface. One of the data interfaces PPC 12 is coupled to the microprocessor core 30 via PLB bus 35 to receive control information, e.g. requests to read data from, and write data to, the off-chip memory. In our preferred embodiment this microprocessor core 30 is a PowerPC core commercially available from IBM Corporation. Another of the data interfaces TB 15 is coupled to the transaction bus 60, while the third data interface Mem 18 is coupled to the memory via a PLB bus 35. The PLB bus is a part of a microprocessor bus architecture developed by IBM Corporation for system-on-a-chip technology. Command and control information is provided to the IKMTU 10 from the security processor 20 over a separate command interface 24. All three data interfaces of the IKMTU 10 connect to the PLB2GBIF Bridge 50. The PLB2GBIF Bridge allows transactions over the PowerPC core 30 and the memory interfaces 52 and 56 to be routed only to and from the PLB Bus, and the transactions over the transaction bus interface to be routed only to and from the transaction bus 60.

All three interfaces 12, 15, and 18 conform to a bus specification, consisting of Header (TH), Address, (TA), and Data (TD) buses, and the two Request-Response (TX-TR) control pins. Typical signals on these buses are described below. The Power PC interface and the memory interface each have 48-bit headers, allow 64-bit addresses and 128 bits of data. The transaction bus interface also provides 64-bit addressing, but with a 32-bit header and 64 bits of data.

The format of the header word is essentially arbitrary but provides for parity bits, selection of CPUs, identification of whether data is to be read and returned or written, selection of I/O spaces, and identification of the initiating device, etc. The format of the IKMTU command control interface signal is also essentially arbitrary, but it receives input signals identifying the CPU making the request, bits to designate a flush of key material, indications that a command is being received together with the op code information, read address and data. Output signals include transmission of the data read, a busy signal, command information such as indication of tampering, failure of authentication, indication of a memory flush, and error signals.

Configuration and reading of the content of all registers inside the IKMTU is performed via the control bus 24, a five signal interface that consists of a request signal, 16-bit command/address bus, 64-bit data in bus, 64-bit data out bus, and a busy status signal. The op codes provide for functionality to write key material; read key material; provide various instructions to the IKMTU (such as run, halt, read, write, status, error, mode, window size), and to the memory (load, flush, set to zero, read, write).

The IKMTU itself provides the encryption and authentication engine. Its purpose is to provide encryption services with tamper detection mechanisms to the on-chip and off-chip storage. For example, it communicates with the embedded dynamic random access memory, eDRAM 66 via its interface 52 or the double data rate synchronous (or other) dynamic random access memory (DDRDRAM) (not shown) through its interface 68. An arbitration circuit 70 allocates use of the PLB bus 35 among the contenders for its use.

The IKMTU acts as a slave unit serving read and write requests initiated by the PowerPC 30 or by units coupled to the Transaction Bus 60. Devices requesting data are collectively referred to as the "Requestor" herein. In turn the IKMTU acts as a master, capable of initiating read or write requests from the targeted memory.

As will be explained in more detail below, the IKMTU uses a combination of the Advanced Encryption Standard (AES) cipher and a hash algorithm for encryption and authentication of the contents of the external memory. Each 16 bytes of data are encrypted with a unique encryption key and tagged with a 16 byte authentication and versioning value that is stored in the DRAM (or other) memory with the encrypted data. Encryption keys are based on the requested address, the write counter (versioning value), a random number, and the encryption (security) mode. The key generation relies on the usage of a large (8K bits long) random number. Such a random number is generated outside of the IKMTU and can be either unique for the duration of a single session or persistent for decrypting previously saved encrypted data.

Figure 2:
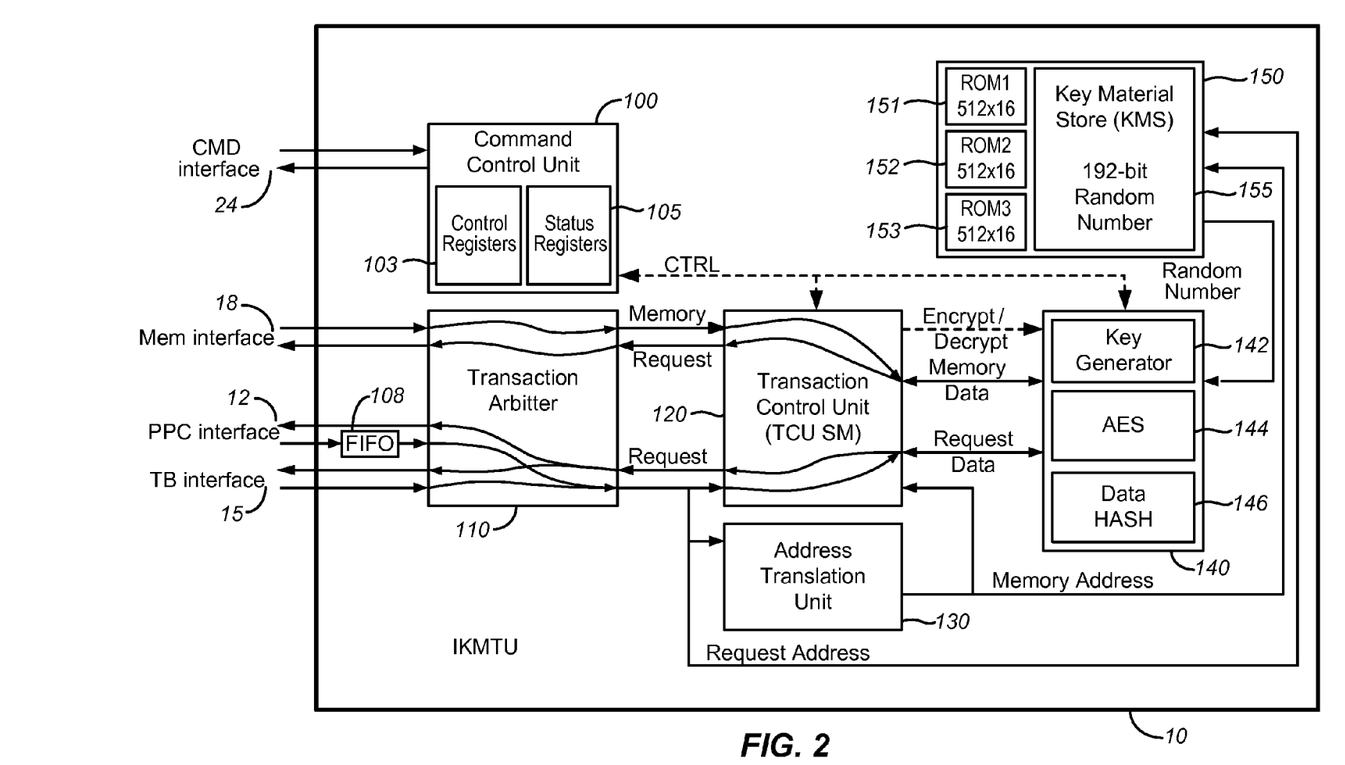
FIG. 2 is a block diagram of the IKMTU unit.

FIG. 2 is a diagram illustrating the IKMTU 10 in functional block form. IKMTU 10 includes a command control unit 100 having control registers 103 and status registers 105. The command control unit 100 is coupled to the command interface 24. A transaction arbiter 110 is coupled to the memory interface 18, the PowerPC interface 12, and the transaction bus interface 15. A first-in first-out (FIFO) memory 108 on the PowerPC interface 12 buffers transactions to the arbiter 110. The arbiter 110 is coupled to a transaction control unit 120 and to an address translation unit 130.

Unit 140 provides key generation 142, AES encryption 144, and data hashing 146. It is coupled to the transaction control unit 120. The key material store (KMS) unit 150 contains 3 read-only memory blocks (ROMs) 151, 152 and 153 and an set of 8192-bit random numbers 155. Key store unit 150 is connected to unit 140. In response to reads or writes invoking the IKMTU, random numbers are provided from the key material store unit 152 to the key generator 142 to encrypt and decrypt data for all transactions with the external memory. Of course, the encryption and decryption function can be disabled by the user if desired.

The IKMTU 10 relies on use of random numbers stored in the key material store 150. The KMS 150 is implemented as two 64×64 buffers, KMS_A and KMS_B (210 and 260 in FIG. 6), together providing an 8192-bit random number. Prior to use, the KMS 150 is initialized with a 8192-bit random number that is generated outside of the IKMTU 10.

Instead of using a true random number, the KMS 150 can be initialized from the onboard ROMs. In the preferred embodiment of the IKMTU 10, the configuration ROM consists of 24-kbits of data. The content of the configuration ROM is a random number that was generated during the system design. Using the configuration ROM, however, as the source of the random number makes the key repeatable and therefore, degrades the strength of the encryption. There are, however, applications in which using the ROMs as the source for the KMS is preferred to using a true random number. One such application is a time critical application, in which the long initialization delays associated with generation of the random number are not acceptable. Other applications in which use of the ROMs may be preferred is an application that needs to generate an encrypted data image that can be restored following a system reset; or an image that can be restored on a different system.

Figure 3:
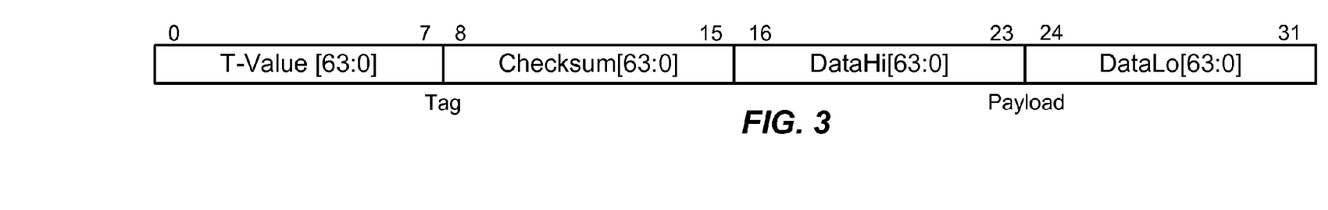
FIG. 3 illustrates the memory data record structure.

The functionality of the IKMTU 10 can be understood with reference to FIGS. 3 through 8, which are discussed next. FIG. 3 illustrates the data record (block) structure for storage of encrypted data in a memory. Encrypted data preferably are stored using 32-byte blocks. Each 32-byte block consists of 16 bytes of tag (8 bytes of write counter and 8 bytes of authentication tag) followed by 16 bytes of the encrypted payload (ciphertext). The 8 byte write counter is a 64-bit field that is incremented every time that particular memory address is written. The incremented value is encrypted to be unique to each address, and this encryption is derived from the requested address and a random number. Because the IKMTU can manage independent memory windows (address blocks), each window is defined by its base and limit addresses. Because every 16 bytes of encrypted data require an additional 16 bytes for versioning tag and authentication, the effective data storage capacity of each window is one half of its physical size. Of course larger or smaller memories and different data and tag sizes could be implemented.

The authentication tag is a 64-bit number that is computed as follows in one exemplary implementation:

DAT=WC+Plaintext [63:0]+Plaintext [127:64]+AC-CUM5 where ACCUM5 is a value derived from the memory address and a random number and WC is the write counter. (This derivation is described with regard to FIG. 4 below). Whenever data are read from the memory, that is with every read or write, the IKMTU performs the following authentication test to verify the validity of the data read:

DAT−WC−Plaintext[63:0]−Plaintext[127:64]=AC-CUM5

The encryption key used in the IKMTU is based on a flow of data in six accumulators. Accumulators 1-4 are used to encrypt and hash in the case of a write, or to restore and decrypt in the case of a read. The 32 bytes of the memory data includes the 16 bytes payload, the 8 bytes write counter, and the 8 bytes of DAT. As shown by the two formulas above, the encrypted data depend on the value from Accumulator 5, which itself depends on the Requested Address and a random number. Accumulator 5 is used to control the hash logic for the Accumulators 1-4. It is also used in the calculation of the checksum field.

Figure 4:
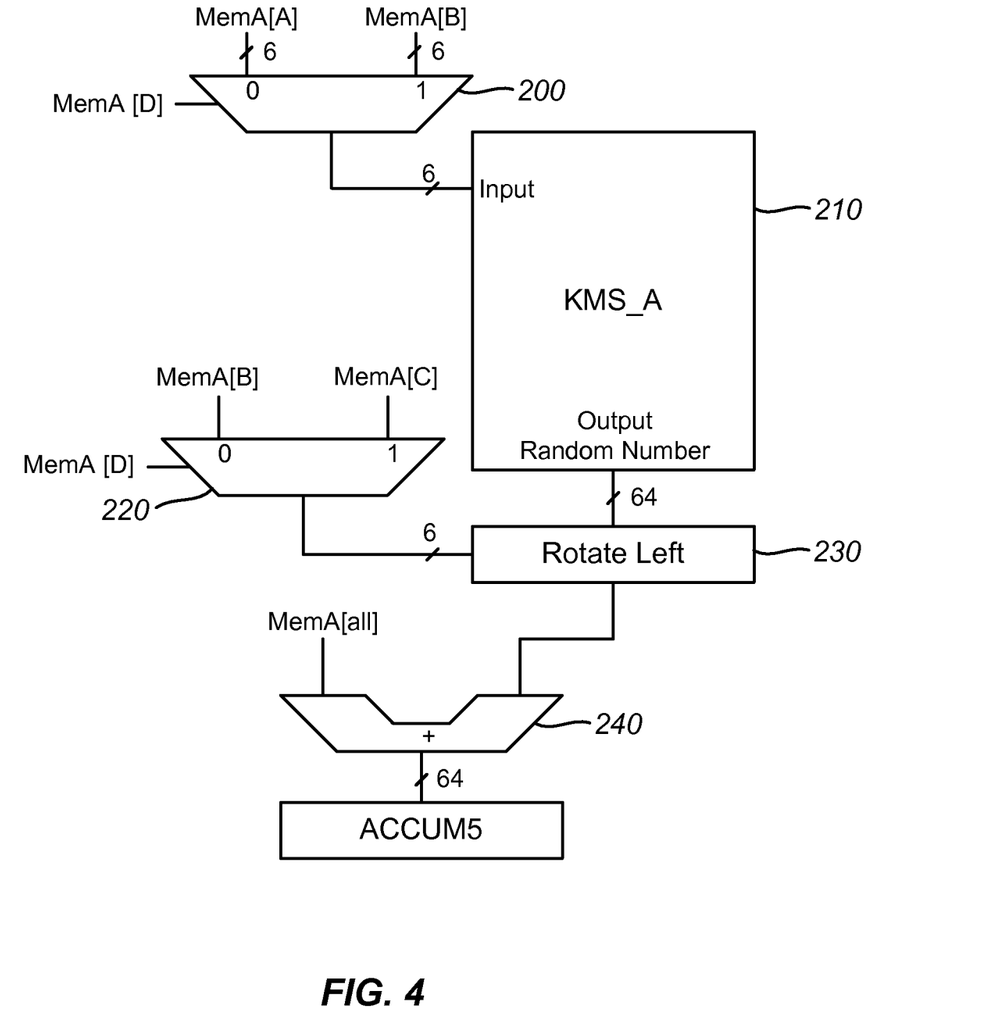
FIG. 4 is a schematic of circuitry of Accumulator 5.

Because Accumulator 5 is used to control the hash logic for the other accumulators 1-4 and 6, Accumulator 5 is discussed first, and is shown in FIG. 4. At the time of boot up, random numbers are generated and stored in key material store sub-unit A 210. Twelve selected address bits are provided to the multiplexer 200 with six address bits A and six address bits B being provided to separate inputs. One or the other input to the mux 200 is selected under control of another address bit D. The resulting selected 6 bits are provided to an input port of key material store unit 210 where the 6 input bits select one of the random numbers stored therein. That random number is provided to the output of KMS 210.

Similarly, address bit sets B and C are provided a multiplexer 220, with six selected address bits B provided to one input, and six different address bits C provided to the other input. The state of address bit D causes one of the sets of address bits B or C to be selected and provided to the rotation register unit 230. That causes the random number from KMS 210 to be rotated and provided to adder 240. Based upon the random number selected by the mux 200, and the rotation selected by the mux 220, the now rotated random number is provided to one input of adder 240. Adder 240 adds that data to the entire memory address provided to its other input to create a 64-bit output designated ACCUM5, which is used by other apparatus described below.

Figure 5:
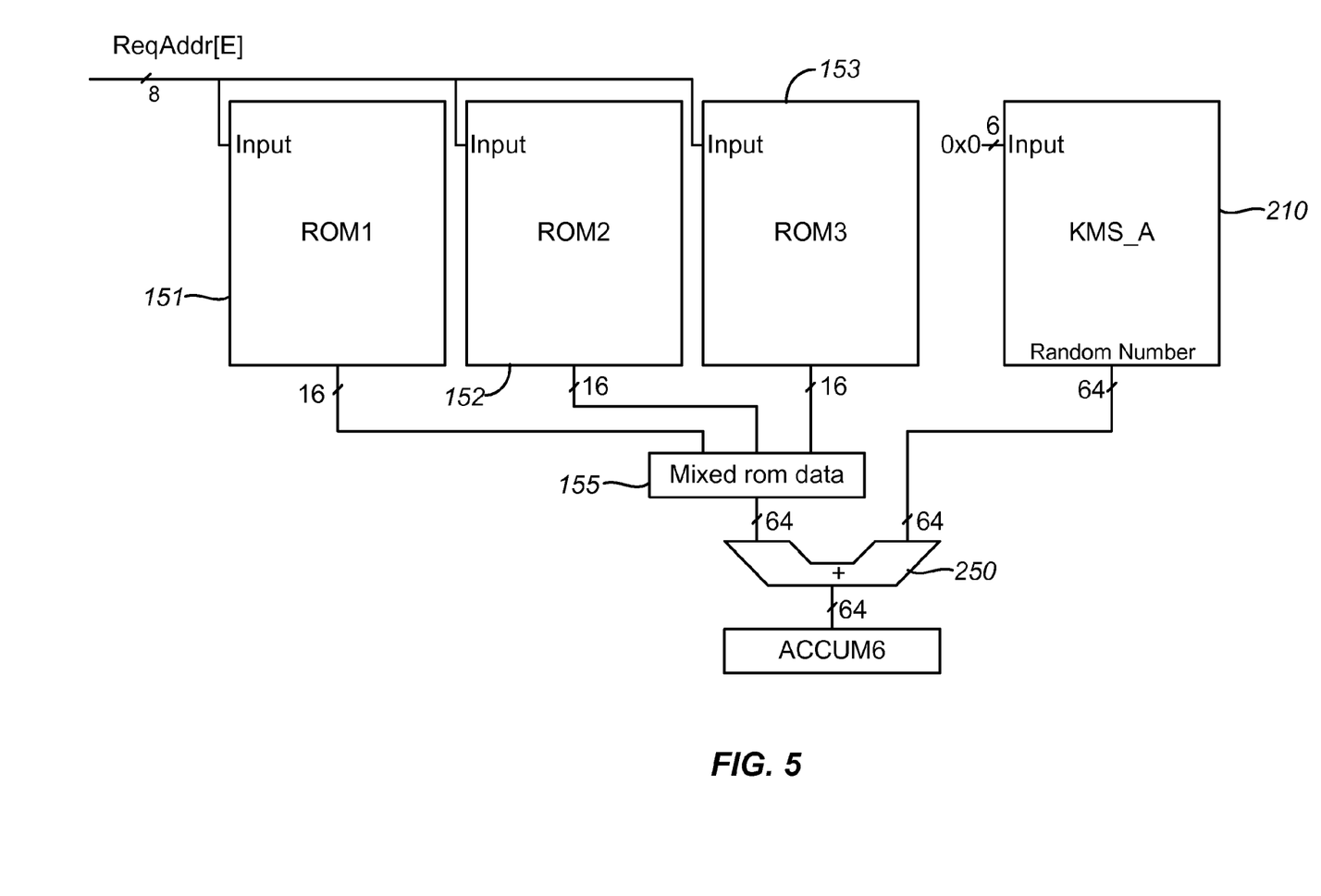
FIG. 5 is a schematic of circuitry of Accumulator 6.

FIG. 5 is a schematic diagram of Accumulator 6. Accumulator 6 is used to generate the 64-bit number by which the write counter is incremented whenever a memory address is written. The 64-bit number by which the write counter is incremented is based on a subset E of the bits in the requested address (ReqAddr). As shown in FIG. 5, bits E from the requested address index into an input port of each of the three ROMs to provide three 16-bit output data which are concatenated and placed in the "mixed" ROM data register 155. The mixed ROM data are provided to one input of an adder 250. The other input of adder 250 receives a random number from KMS 210 selected by address bits F provided to an input port. Adder 250 adds the mixed ROM data at one input to the random number from unit 219 to provide a 64-bit output as ACCUM6. ACCUM6 is used by other units in the IKMTU described below.

Figure 6:
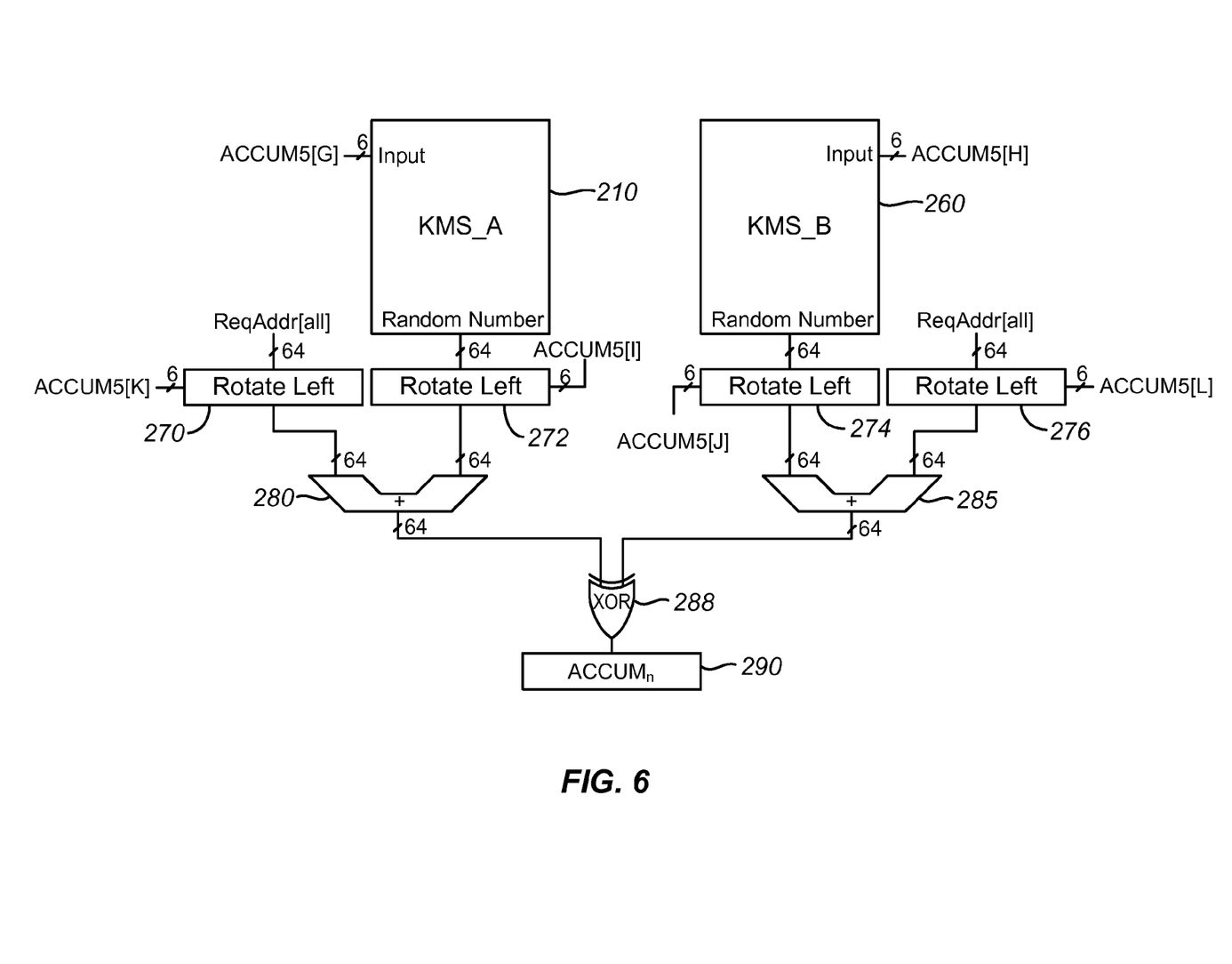
FIG. 6 is a schematic of circuitry of accumulators 1 through 4.

FIG. 6 is a schematic of one of accumulators 1-4. All four units are identical in function. In a similar manner to the notation discussed above, subsets of bits from the ACCUM5 value computed earlier are used to encrypt and hash (in case of the write) or restore and decrypt (in case of the read) the 32 bytes of the memory data that includes the 16 bytes of payload, the 8-byte write counter, and the 8-byte DAT. Each of the accumulators 1-4 is identical except that different sets of address bits are provided to and used by each. Each of the accumulators 1-4 rely on ACCUM5, the Requested Address, and random numbers from the KMS A 210 and KMS B 260.

As shown in FIG. 6, a subset G of bits from the value ACCUM5 is provided to the input port of KMS A 210. These bits select one of the random numbers stored in unit 210 and provides that random number at the output port of unit 210. The random number from unit 210 is then rotated by unit 272 by an amount based upon the values of bit set I from the output of ACCUM5. This rotated random number is provided to one input of adder 280. At the same time unit 270 rotates the value of ReqAddr by an amount determined by the K bit set provided to control the rotation. The rotated 64-bit requested address is provided to the other input of adder 280. The results of the summation is provided to one input of exclusive OR gate 288.

The other side of each of the accumulators 1-4 operates in the same manner as just described. A subset H of bits from the value ACCUM5 is provided to the input port of each of KMS B 260. These bits select one of the random numbers stored in unit 260 and provides that random number at the output port of unit 260. The random number from unit 260 is then rotated by unit 274 by an amount based upon the values of bit set J from the output of ACCUM5. This rotated random number is provided to one input of adder 285. At the same time unit 276 rotates the value of ReqAddr by an amount determined by the L bit set provided to control the rotation. The rotated 64-bit requested address is provided to the other input of adder 285. The results of the summation is provided to the other input of exclusive OR gate 288. The output value from gate 288 is ACCUMn, where n corresponds to accumulators 1-4.

The output values from the six accumulator circuits ACCUM1-6 described above are used in reads and writes. The manner in which these reads and writes are performed is discussed next.

Figure 7:
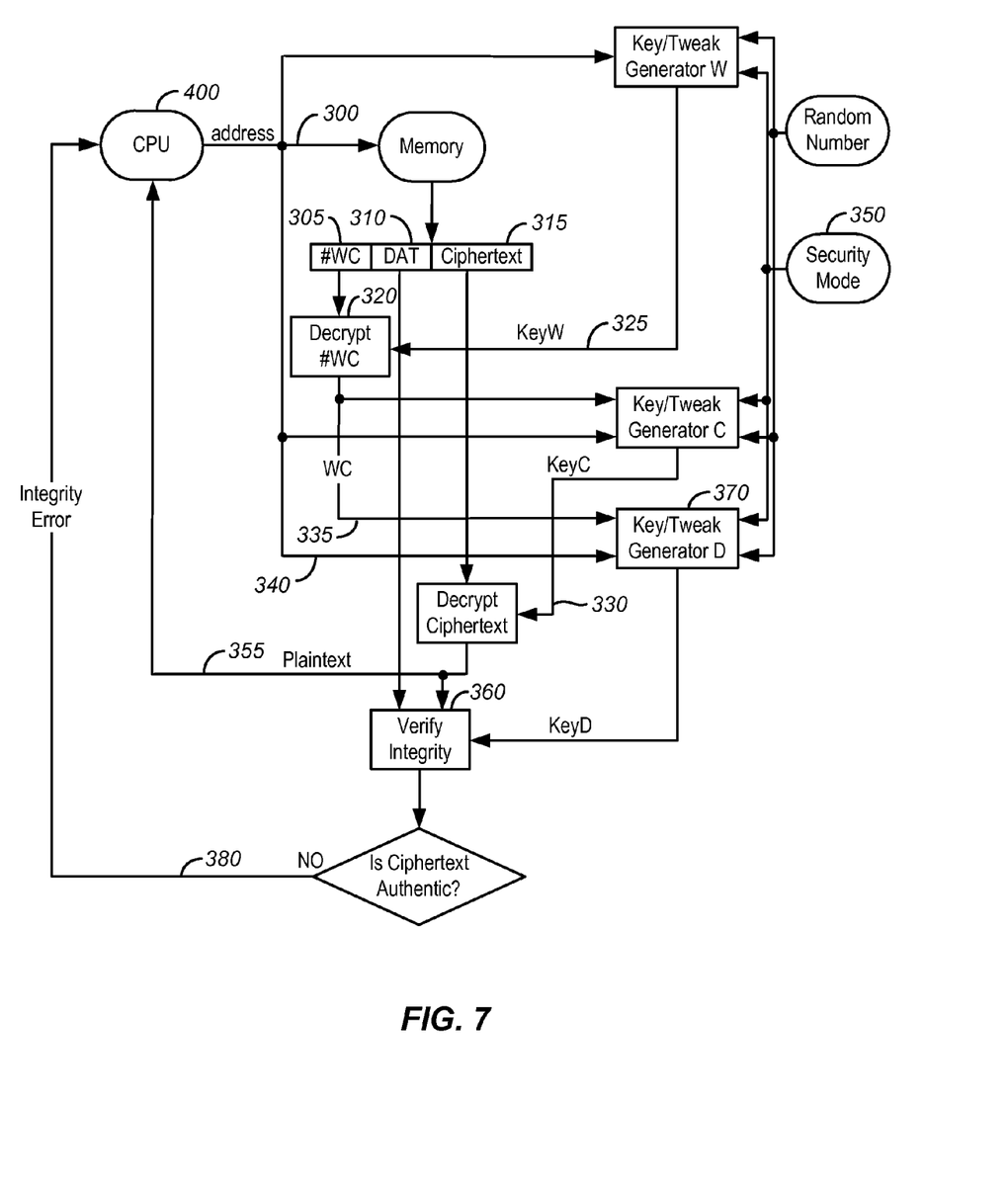
FIG. 7 is a write flow diagram of the IKMTU unit.
Figure 8:
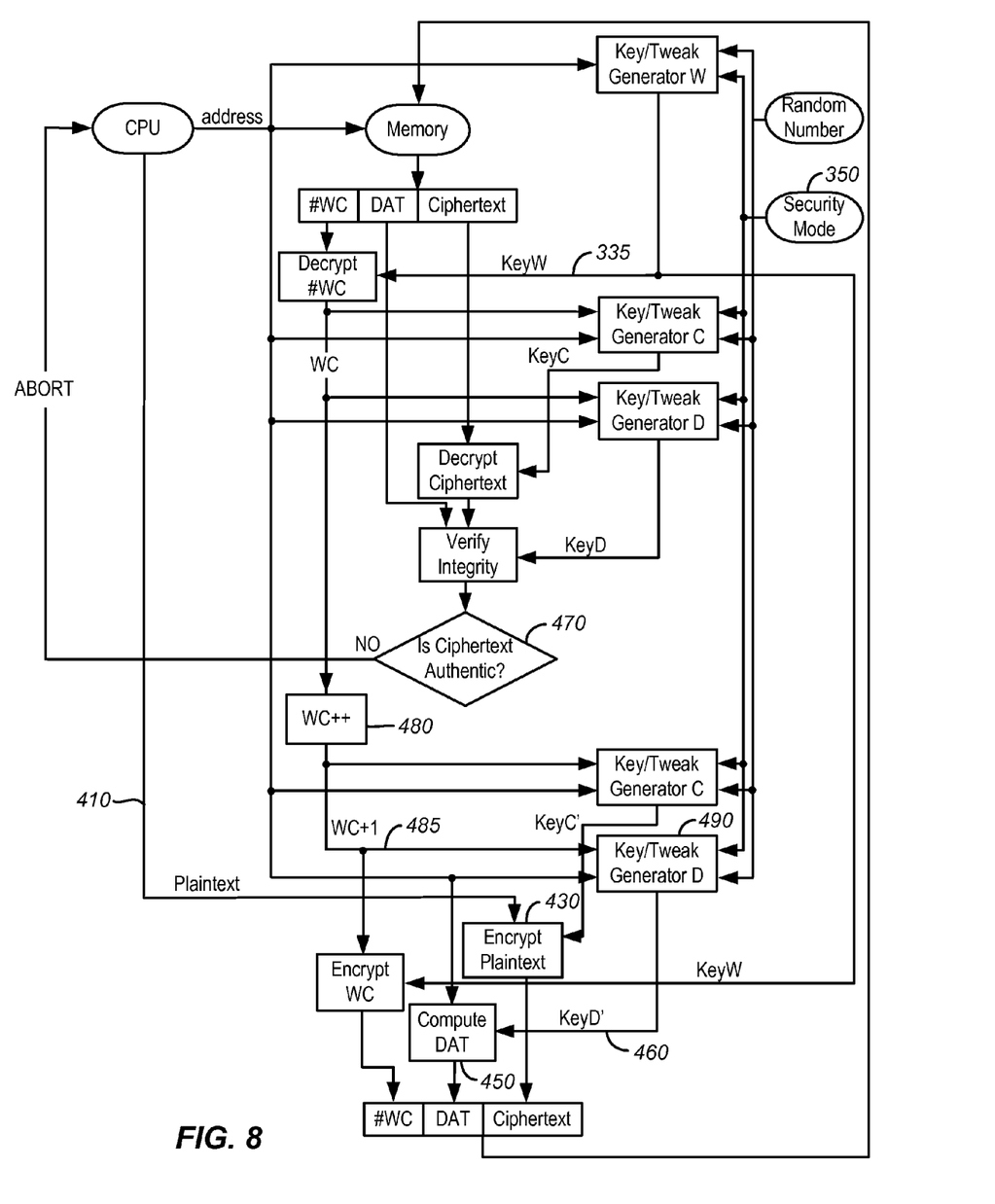
FIG. 8 is a read flow diagram of the IKMTU unit.

The general dataflow of the IKMTU is described in conjunction with FIGS. 7 and 8. FIG. 7 illustrates the process for a "read" from memory. Here the microprocessor generates a request for data from a certain memory address and provides that address on bus 300. The response to this request is a memory data record. It contains an encrypted write counter value #WC which diversifies the encryption and data authentication, serving as a "number-used-once," often termed a nonce. It also contains a data authentication tag (DAT) 310 and a block of ciphertext 315.

The purpose of the nonce is to diversify the encryption in time. The ciphertext of the same or related plaintext data written to the same memory location at a different time appears unrelated to the original. One way to create a unique nonce is using a write counter value (WC) which is incremented each time the corresponding memory location is written, and stored encrypted. In the lifetime of a secure processor operating at reasonable speed a 64-bit counter would never reach its maximum, and therefore an 8-byte field for the nonce is sufficient.

The "Ciphertext" associated with the write counter value #WC and the tag DAT refers to a block of data to be stored in memory (normally 16 bytes), which are encrypted together. "Ciphertext" refers to plaintext data after application of the cipher. It has the two pieces of auxiliary information attached to it—the encrypted write counter (#WC) as a nonce and the data authentication tag (DAT). As explained above, the encryption system here depends on random keys, the attached WC, as a number-used-once (nonce) and on the memory address where the ciphertext is stored. These dependencies are created by generating keys, which are unique for each memory location and nonce value, at very high probability. Alternatively, the encryption could be tweaked by using an exclusive-OR with a value derived from the scrambled memory address and nonce, to the plaintext and to the ciphertext before storing it in the memory. The purpose of diversifying the encryption with the memory address is to hide from an adversary when the same or related data is stored at different memory locations, as well as to prevent copy-and-paste attacks.

Once the data is retrieved, the write counter #WC is decrypted 320 using a cipher of random keys 325, diversified by the memory location and the security mode. The #WC was used to diversify the DAT and the encryption of the plaintext, together with the memory address and the security mode.

Decryption of the ciphertext 315 uses the random keys received over bus 330, the decryption of the #WC value, i.e. the newly computed WC 335, the memory address 340 and the security mode 350. The result of the decryption is the plaintext 355, returned to the CPU 400 in response to its data request.

The integrity of the stored data also is also protected from accidental or malicious changes. Because random access memory data is accessed block-by-block, each individual block has a data authentication tag (DAT) attached. The DAT is the plaintext data encrypted under keys different from the ones used for ciphertext generation. In addition, this encryption, too depends on the nonce and the memory address. The result may be truncated to the length the security of the application dictates. For example, with a 64-bit DAT the probability that an alteration of a data block remains undetected is extremely small ($2^{-64} \approx 0.000,000,000,000,000,000,05$)

Before the CPU can use the plaintext, however, the integrity of the data is verified at step 360. From the plaintext, the newly computed WC 335, the memory address 340 and the security mode 350, other random keys 370 are generated, which are used for the reconstruction of the DAT. If it is different from the stored DAT 310, the data has been altered. If this occurs, the CPU 400 is notified 380 and appropriate actions are performed as governed by previously defined policies, for example, shutting down the system, notifying the user, etc.

FIG. 8 is a diagram which extends FIG. 7. The lower portion of the diagram of FIG. 8 illustrates the additional operations for a write to the memory. Before the plaintext 410 from CPU 400 is written to the memory 420, it is encrypted 430 and its DAT 450 computed using WC as a new nonce 485. When the nonce is based on a write counter as described earlier, it is read from the memory and incremented. In this manner the previous data at the actual memory address is always accessed. Adding a small delay, but added protection against an adversary tampering with the memory, the previous ciphertext 330 is decrypted and the corresponding DAT is computed and verified 470, in the same way as for a memory read operation.

The decrypted WC is incremented 480, and stored after encryption, dependent on keys, the address and security mode. This new WC' value 485 is then used to diversify the encryption of the plaintext provided by the CPU. This encryption also depends on keys, the memory address and the security mode. Finally, the data authentication tag (DAT) is computed from the plaintext. It is based on another encryption operation 490, using random keys and diversified by WC', by the memory address and by the security mode indicator. The three pieces of information (#WC, DAT and ciphertext) are written 420 to the memory.

In summary, a read data operation is performed as follows:
1. Translate the logical address into the memory physical address.
2. Read 32 bytes of the encrypted data from the memory.
3. Generate the decryption and authentication keys. Use both the logical and the physical addresses, together with the stored write counter, security mode and the random number for the key generation, with each resulting key being unique to each memory location and write counter value, with very high probability.
4. Assuming the data are not all zeros use the keys generated in step 3 together with the authentication fields of the data to decrypt the payload and to authenticate the payload. If the authentication fails, activate anti-tamper mechanisms, otherwise continue on to step 5.
5. If the current cycle is a read request then send the decrypted payload to the requestor, otherwise proceed to complete the write request.

In summary, a write data operation is performed always preceded by a read operation from the same memory location, as follows:
1. Use the byte enable field of the write request to merge the data to be written with the data read from the memory. The data read from memory was decrypted and authenticated during the read operation.
2. Increment the write counter by 1 (or alternatively by a unique 64 bit number that is based on the logical requested address).
3. Generate the data authentication tag DAT using the newly merged write data using the authentication key, which is based on the memory addresses, together with the updated write counter, security mode and the random number. Each resulting authentication key is unique to each memory location and write counter, with very high probability.
4. Encrypt the merged write data using a new encryption key, which is different from the key that was used in reading the data for the decryption, because the updated write counter is included in its generation.
5. Write 32 bytes back to memory.

The preceding description of the preferred embodiment of our infinite key memory transaction unit has been described with many specific details, for example, groups and numbers of address bits being supplied to particular inputs of various circuits. It will be appreciated that these details are provided to illustrate the invention, but that the scope of the invention is defined by the appended claims.

What is claimed is:

1. A method for storing ciphertext data at an address in memory of a computer system, the method comprising:
   generating an encryption key as a function of the address and versioning information, the versioning information based on a number of writes to the address:
   encrypting plaintext data with the encryption key;
   generating an authentication value for the address, the authentication value including a keyed hash value that is based on the versioning information, the plaintext data, a random number, and the address; and
   storing the encrypted data, the versioning information, and the authentication value at the address.

2. A method as in claim 1 wherein the authentication value for the address is a function of the versioning information, the plaintext, and an accumulator value based on the random number and the address.

3. A method as in claim 2 wherein the accumulator value is used to compute a key that controls hash logic for generating the authentication value.

4. A method for providing data security in a computer system including memory, the method comprising:
   retrieving encrypted data, a write counter (WC) value and an authentication value stored at an address of the memory, the encrypted data being plaintext data that was encrypted with a unique encryption key for the address, the WC value based on the number of writes made to the address, the authentication value based on a sum of the WC value for the address, the plaintext data for the address and an accumulator value based on a random number;
   decrypting the retrieved data and checking the retrieved authentication value to determine whether the decrypted data are valid, wherein, checking the authentication value comprises subtracting the sum of the WC value and the unencrypted data from the authentication value; and
   if the decrypted data are valid writing new data to the address from which the data was retrieved using a new key for the encryption of the data, the new key based at least on the address, the updated version information and on the number of writes made to that address.

5. A method as in claim 4 wherein the decrypted data are considered valid if the step of subtracting results in a number which matches contents of an earlier computed accumulator value.

6. A method as in claim 5 wherein the accumulator value was computed using a portion of the address to select a random number stored in a memory.

7. A method as in claim 6 wherein the portion of the address is selected by a portion of the address itself.

8. A method as in claim 7 wherein before being used the random number is rotated based on another portion of the address.

9. A method as in claim 8 wherein the accumulator value comprises addition of the memory address to the random number after being rotated.

10. A method for responding to a request for plaintext data by a unit in a computer system comprising:
    receiving an address from the requesting unit;
    generating a statstistically different encryption key using the address and a write counter (WC) value, the WC value based on a number of writes to the address;
    reading encrypted data and a keyed hash value stored at the address;
    using the encryption key to decrypt the encrypted and the data,
    using the keyed hash value the address, and the WC value to authenticate the decrypted data; and
    if the authentication is successful sending the decrypted data to the requesting unit.

11. A method as in claim 10 wherein the address received from the requesting unit is a logical address and the method further comprises:
    converting the logical address into a physical address; and
    the step of reading the data reads the data from the physical address.

12. A method as in claim 11 wherein the step of generating the encryption key further comprises generating an encryption key using at least the logical address, the physical address, and a random number.

13. A method as in claim 12 wherein if during an initial use read of the memory, if the decrypted data does not have a predetermined content then an anti-tamper mechanism is triggered.

14. A method as in claim 10 wherein the authentication includes comparing the retrieved hash value to a keyed hash value computed from the address and the retrieved WC value to verify that the data being read has not been tampered with.

15. Apparatus for providing security for storing and retrieving data comprising:
    a memory having a set of addressable locations; and
    a processor for reading data from the memory and writing data to the memory, the processor being configured to store ciphertext data at an address by generating an encryption key based on the address and version information; generating an authentication value as a hash value keyed from the address the plaintext data and the version information encrypting the plaintext data with the encryption key; and storing (i) the encrypted data, (ii) version information and (iii) the authentication value at the address,
    wherein the processor modifies the write counter value for each new write operation at the address.

16. Apparatus as in claim 15 wherein when reading data from an address in the memory the processor is further configured to retrieve the encrypted data, the version information and the authentication value stored at the address; decrypt the encrypted data; and use the authentication value and the version information to authenticate the decrypted data.

17. Apparatus as in claim 16 wherein the processor is further configured to, if the decrypted data are valid, write new ciphertext data to the address using a new encryption key generated from the address, and updated version information.

* * * * *